US011332585B2

(12) United States Patent
Bousmina et al.

(10) Patent No.: US 11,332,585 B2
(45) Date of Patent: May 17, 2022

(54) GIANT MACROMOLECULES: COPOLYDENDRIMERS CONTAINING HETEROATOMS

(71) Applicant: UNIVERSITE EUROMEDITERRANEENNE DE FES, Fès (MA)

(72) Inventors: Mosto Bousmina, Fès (MA); Nadia Katir, Fès (MA); Abdelkrim El Kadib, Fès (MA); Nabil El Brahmi, Fès (MA); Jean-Pierre Majoral, Toulouse (FR); Nathalie Marcotte, Montpellier (FR)

(73) Assignee: UNIVERSITE EUROMEDITERRANEENNE DE FES, Fès (MA)

( * ) Notice: Subject to any disclaimer, the term of this patent is extended or adjusted under 35 U.S.C. 154(b) by 546 days.

(21) Appl. No.: 16/312,664

(22) PCT Filed: Aug. 2, 2017

(86) PCT No.: PCT/MA2017/000017
§ 371 (c)(1),
(2) Date: Apr. 19, 2019

(87) PCT Pub. No.: WO2017/222358
PCT Pub. Date: Dec. 28, 2017

(65) Prior Publication Data
US 2019/0256666 A1     Aug. 22, 2019

(30) Foreign Application Priority Data

Jun. 21, 2016  (MA) .......................................... 39136

(51) Int. Cl.
| | |
|---|---|
| *C08G 83/00* | (2006.01) |
| *C08K 5/34* | (2006.01) |
| *C08K 5/5398* | (2006.01) |
| *C08L 101/00* | (2006.01) |
| *C08L 101/02* | (2006.01) |
| *C08L 101/06* | (2006.01) |
| *C08J 3/24* | (2006.01) |
| *C08L 85/02* | (2006.01) |
| *B82Y 40/00* | (2011.01) |

(52) U.S. Cl.
CPC .......... *C08G 83/004* (2013.01); *C08G 83/003* (2013.01); *C08J 3/246* (2013.01); *C08K 5/34* (2013.01); *C08K 5/5398* (2013.01); *C08L 85/02* (2013.01); *C08L 101/005* (2013.01); *C08L 101/025* (2013.01); *C08L 101/06* (2013.01); *B82Y 40/00* (2013.01); *C08J 2300/202* (2013.01); *C08J 2400/202* (2013.01)

(58) Field of Classification Search
CPC ..... B82Y 40/00; C08J 3/246; C08J 2300/202; C08J 2300/204; C08J 2300/206; C08J 2400/202; C08J 2400/204; C08J 2400/206; C08L 85/02; C08L 101/00; C08L 101/005; C08L 101/02; C08L 101/025; C08L 101/04; C08L 101/06; C08L 101/08; C08L 101/10; C08L 101/12; C08L 101/16; C08G 83/00; C08G 83/001; C08G 83/002; C08G 83/003; C08G 83/004; C08G 83/005; C08G 83/006; C08G 83/007; C08G 83/008
See application file for complete search history.

(56) References Cited

U.S. PATENT DOCUMENTS

2007/0083034 A1* 4/2007 Caminade ............ C10M 137/14
528/398
2013/0336997 A1* 12/2013 Pou ....................... C07F 9/3873
424/184.1

FOREIGN PATENT DOCUMENTS

| EP | 0 893 482 A1 | 1/1999 |
| WO | WO 01/87348 A2 | 11/2001 |

OTHER PUBLICATIONS

International Search Report as issued in International Patent Application No. PCT/MA2017/000017, dated Mar. 8, 2018.
Caminade, A.-M., et al., "Phosphorus dendrimers as viewed by $^{31}$P NMR spectroscopy; synthesis and characterization," Comptes Rendus Chimie, vol. 13, (2010), pp. 1006-1027.
Beheshteh Khodadadi Chegeni, et al., "pH-sensitive supramolecular copolydendrimers, new anticancer drug delivery system," Colloid Polym Sci (2014), pp. 3337-3346.
Katir, N., et al., "Synthesis of Onion-Peel Nanodendritic Structures with Sequential Functional Phosphorus Diversity," CHEMISTRY: A European Journal, ChemPubSoc Europe, DOI: 10.1002/chem.201500138, (2015), pp. 6400-6408.
Tomalia, D. A., et al. , "Dendritic Macromolecules: Synthesis of Starburst Dendrimers," Macromolecules, vol. 19, No. 9, (1986), pp. 2466-2468.

* cited by examiner

*Primary Examiner* — Christopher M Rodd
(74) *Attorney, Agent, or Firm* — Pillsbury Winthrop Shaw Pittman LLP

(57) ABSTRACT

A synthesis method includes synthesising copolydendrimers containing heteroatoms from at least two dendrimers as starting precursors.

6 Claims, 3 Drawing Sheets aldehyde terminated dendrimers carboxylic terminated dendrimers amine terminated dendrimers

GIANT MACROMOLECULES: COPOLYDENDRIMERS CONTAINING HETEROATOMS

CROSS-REFERENCE TO RELATED APPLICATIONS

This application is the U.S. National Stage of PCT/MA2017/000017, filed Aug. 2, 2017, which in turn claims priority to Moroccan Patent Application No. 39136 filed Jun. 21, 2016, the entire contents of all applications are incorporated herein by reference in their entireties.

FIELD OF THE INVENTION

The present invention describes a new class of giant macromolecules herein called: copolydendrimers. The invention consists in the association of at least two dendritic entities containing heteroatoms and their combination by polymeric co-condensation to form a three-dimensional branched network. This new category of three-dimensional copolymers offers a novel potential in polymer technology on account of their particular features: globular shape, molecular complexity, porosity, sphericity, stability, etc., which makes them a material of choice in numerous applications in the field of macro-, nano- and poly-structured materials.

PRIOR ART

The synthesis and the manufacturing engineering of polymers is one of the most interesting fields, both at an academic level and on an industrial scale, and generates significant economic activity. The virtually unlimited applications of polymers requires constantly having available an extensive library of macromolecules with different variants and evaluating the properties thereof. The development of new macromolecular architectures widens the range of properties and opens up new application niches for polymers. Among the most interesting macromolecules, cross-linked objects occupy an inescapably prominent place in this field and find varied applications including for example, chromatography, storage and separation of gases, filtration and nanofiltration, detection, automobiles and aeronautics, biomaterials, coatings as well as composite materials and nancocomposites. Specifically, "covalent organic framework" polymers are prepared by co-condensation of small soluble monomers having several polymerisable functions, which enables their growth in three dimensions. These polymer materials are used for trapping $CO_2$, catalysis, separating gases and detection.

On the other hand, and closely connected with the field of giant macromolecules, dendrimers are molecules of high molecular weight, functional and highly branched. Dendrimers may be distinguished from their linear analogues by the great precision of their manufacture given that they are built up step by step, by the repetition of a reaction sequence enabling the multiplication of each repetitive unit and terminal functions. This construction leads to mono-disperse, homogenous macromolecules provided with a specific topology in terms of periodicity and a concentration of reactivity at their surface. The adjustable character of the core, branches and functions localised on the surface makes it possible to readily diversify their reactivity (Katir, N.; El Brahmi, N.; El Kadib, A.; Mignani, S.; Caminade, A.-M.; Bousmina, M.; Majoral, J. P. *Synthesis of Onion-Peel Nano-dendritic Structures with Sequential Functional Phosphorus Diversity. Chem. Eur. J.*, 015, 21, 6400-6408). The control of their arborescence with a great degree of precision accompanied by what is commonly designated as "generational effect" are certainly the most advantageous elements in the chemistry of dendrimers. This makes it possible to manufacture made-to-measure chemical objects and then to adjust the performances thereof. The first dendrimer was described by Tomalia in 1986 (Tomalia, D. A.; Baker, H.; Dewald, J.; Hall, M.; Kallos, G.; Martin, S.; Roeck, J.; Ryder, J.; Smith, P. *Dendritic macromolecules: synthesis of starburst dendrimers. Macromolecules*, 1986, 19, 2466-2468). The particularity of dendrimers as macromolecules has led to their implementation in a series of applications, notably the manufacture of diagnostic tools and as carriers of medicines. Their bio-inspired structure, very similar to a giant tree, confers on these dendrimers a remarkable reactivity notably with biological cells, which makes them tools that cannot be ignored in nanomedicine. In this category, phosphorous dendrimers are still the most interesting for several reasons: the presence of phosphorous in the backbone of dendrimers offers the possibility of a fine and precise characterisation of these edifices, notably by phosphorous NMR (Caminade, A.-M.; Laurent, R.; Turrin, C.-O.; Rebout, C.; Delavaux-Nicot, B.; Quail, A.; Zablocka, M.; Majoral, J.-P. *Phosphorus dendrimers as viewed by $^{31}P$ NMR spectroscopy; synthesis and characterization. C. R. Chimie*, 2010, 13, 1006-1027). The living character of phosphorous-nitrogen combinations constitutes a potential for biomedical applications. The hydrophobicity of their core and the polarity of the external groups confers on these dendrimers an amphiphilic character; these two aspects could be behind their similarity with enzymes. Finally, their inorganic character and the presence of heteroatom ensures they have great stability.

By distinction with conventional polymers (FIG. 1a), the design of copolymers (also called block polymers) developed until now has shown that the cohabitation of several segments in the same polymeric backbone confers on the final polymer the initial properties of each block (FIG. 1b). If in addition the starting blocks are complex, their combination in the final material should lead to a holistic accumulation of properties. In other words, the final polymer will not only inherit the properties of the starting elements but will also generate properties that will be specific thereto. For example, these polymers may have intuitively the reactivity of the starting entities but have in addition hierarchical porosity, preferential orientation, hydrophobicity and enhanced stability. All these elements are of great interest in the technology of polymers, their formulation and the synthesis of new materials and nanocomposites.

For example, to increase the macromolecular complexity of an edifice, dendrimers have been grafted onto the side chains of linear polymers (FIG. 1c). Hyperbranched dendrimers have also been synthesised by cross-linking. However, these works only disclose an extension to already known macromolecules. Indeed, no work has concerned the synthesis of three-dimensional structures by polymerisation of two or more dendritic globules containing heteroatoms (FIG. 1d).

The inventors have developed a method for synthesising poly-structured macromolecules and also a new class of giant macromolecules by polymerisation of entities having great molecular complexity, in this particular instance dendrimers. The polymers that result therefrom are called copolydendrimers.

DESCRIPTION OF THE INVENTION

A first aspect of the invention consists in the preparation of new dendritic copolymers combined together by a new synthesis method.

According to a second aspect of the invention, the preparation of copolydendrimers by radical polymerisation or by polymeric co-condensation of two or more different dendrimers containing heteroatoms is reported.

According to a third aspect of the invention, the copolymerisation of at least two different dendrimers containing heteroatoms is reported, said copolymerisation taking place in the absence of metal as catalyst.

A fourth aspect of the invention relates to the polymeric co-condensation of at least two different dendrimers containing heteroatoms and having respectively aldehyde groups and amine groups.

According to a fifth aspect of the invention, the polymeric co-condensation of at least two different dendrimers containing heteroatoms and having respectively carboxylic acid groups and amine groups is described.

According to a sixth aspect of the invention, the polymeric co-condensation by radical process of at least two different dendrimers containing heteroatoms is provided.

According to a seventh aspect of the invention, the use of different generations of dendrimers in the polymeric co-condensation of several heteroatom containing dendrimers is provided.

According to an eighth aspect of the invention, the use of dendrimers with phosphorous, nitrogen, and sulphur groups is provided.

According to a ninth aspect of the invention, the use in these polymeric co-condensations, of phosphorous, nitrogen and sulphur dendrimers, containing a molecule of viologen is provided.

Table 1. Table describing the combinations having made it possible to access the copolydendrimers and specifying the number of phosphorous atoms contained in the final polymer.

Figure 1:
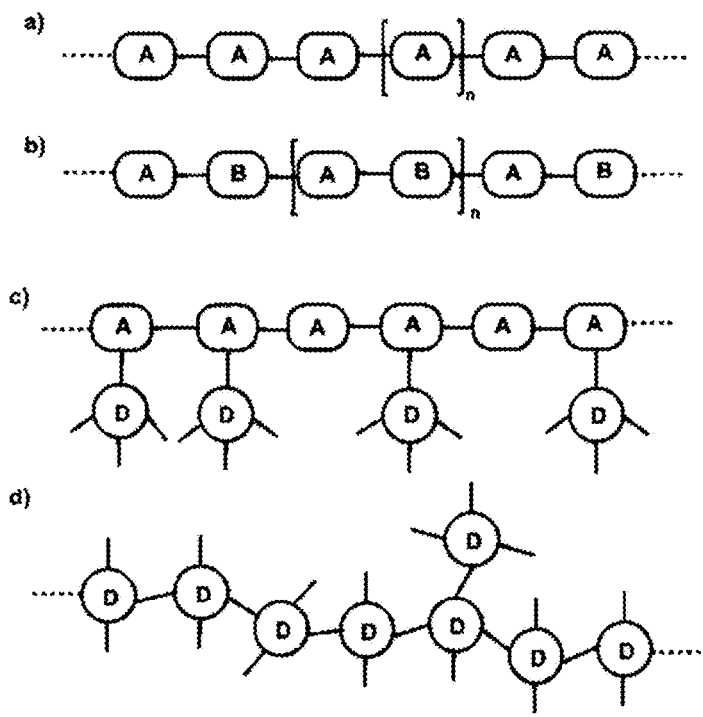
FIG. 1. Illustration of different existing polymeric structures (a-c) and the structure forming the subject matter of the present invention (d).
Figure 2:
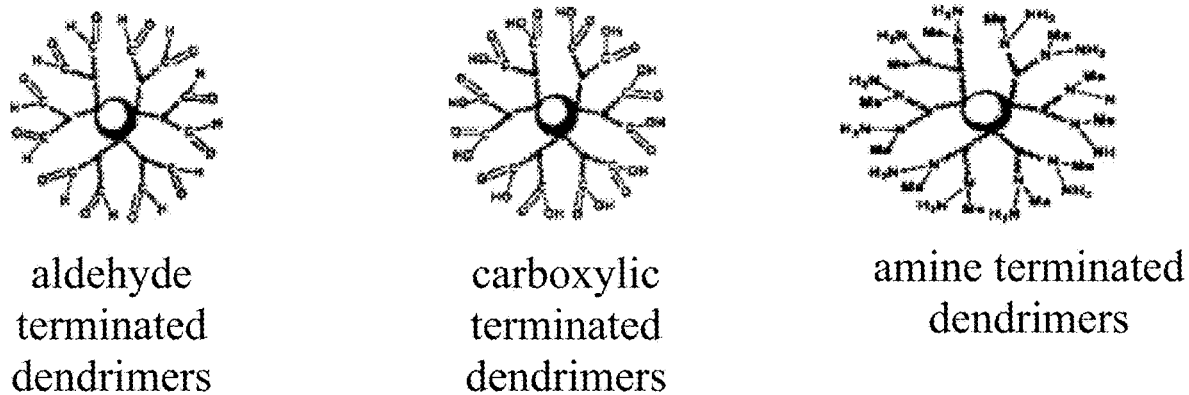

FIG. 2. Representative diagram of amine terminated, aldehyde terminated or carboxylic acid terminated dendrimers.

Figure 3:
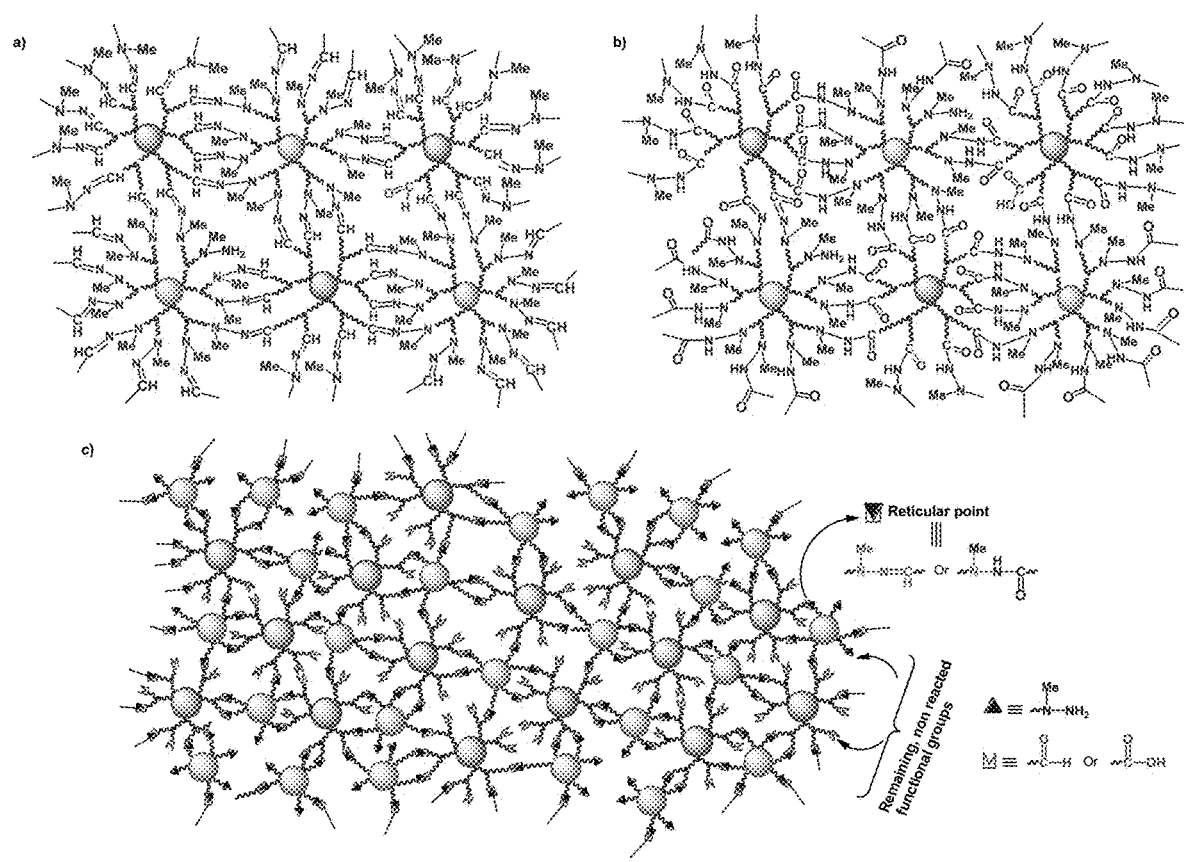

FIG. 3. Description of the copolymerisation of the aforementioned entities.

Figure 4:
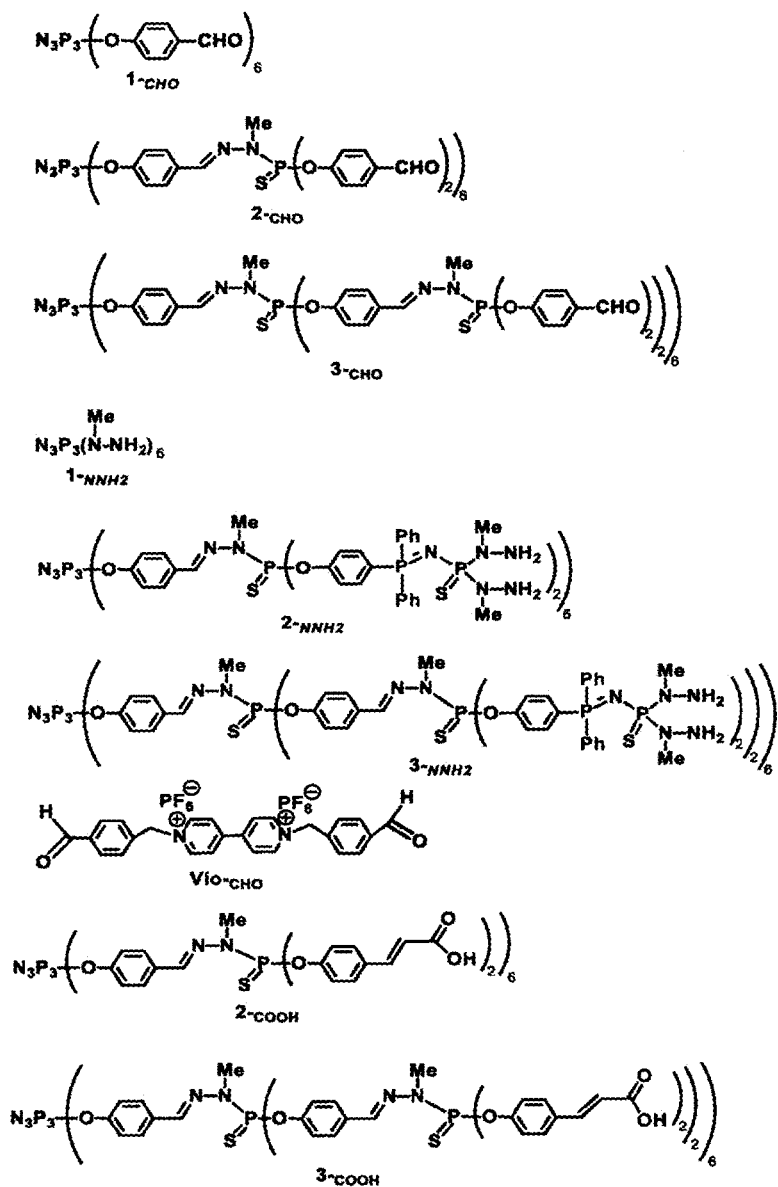

FIG. 4. Charter of units used for the synthesis of copolydendrimers.

NON-LIMITING EXAMPLE OF PREPARATION OF COPOLYDENDRIMERS

TALBE 1

| Polydendrimer | Dendrimer 1 | Dendrimer 2 | Number of phosphorus units | NMR $^{31}$P core | NMR $^{31}$P P = S |
|---|---|---|---|---|---|
| P1 | 1-$_{NNH2}$ | 1-$_{CHO}$ | 2 | 9.33 17.31 | |
| P2 | 2-$_{NNH2}$ | 2-$_{CHO}$ | 6 | 8.35 | 56.47 |
| P3 | 2-$_{NNH2}$ | 3-$_{CHO}$ | 7 | 8.52 | 57.14 |
| P4 | 3-$_{NNH2}$ | Vio-$_{CHO}$ | 6 | 10.63 | 57.67 |
| P5 | 1-$_{NNH2}$ | 1-$_{COOH}$ | 3 | 9.13 27.79 | 60.73 |
| P6 | 1-$_{NNH2}$ | 2-$_{COOH}$ | 4 | 9.14 27.27 | 61.78 |

$P_1$: To a solution of the dendrimer 1-$_{NNH2}$ (20 mg, 4.94 10$^{-5}$ mol) in 3 mL of THF is added a solution of the dendrimer 1-$_{CHO}$ (42.5 mg, 4.93 10$^{-5}$ mol) in 5 mL of THF. The mixture is left under stirring at ambient temperature for 48 hours. After filtration, the solid is washed with THF then ethanol and finally with acetone. The polydendrimer $P_1$ is obtained in the form of a white powder. $^{13}$C NMR (100 MHz) δ 31.18 (N-Me), 121.15 (C$_6$H$_4$), 127.70 (C$_6$H$_4$), 128.63 (C$_6$H$_4$), 133.50 (CH=N and (C$_6$H$_4$)), 150.05 (C$_6$H$_4$), 154.71 (C$_6$H$_4$); $^{31}$P NMR (162 MHz) δ 9.33 (N$_3$P$_3$—O), 17.31 (N$_3$P$_3$—N).

$P_2$: To a solution of the dendrimer 2-$_{NNH2}$ (40 mg, 5.94 10$^{-6}$ mol) in 4 mL of THF is added a solution of the dendrimer 2-$_{CHO}$ (34 mg, 1.19 10$^{-5}$ mol) in 6 mL of THF. The reaction mixture is left under stirring at ambient temperature for 48 hours. After filtration, the solid is washed with THF, ethanol then acetone. The polydendrimer $P_2$ is obtained in the form of a white powder. $^{13}$C NMR (100 MHz) δ 32.35 (N-Me), 121.32 (C$_6$H$_4$), 128.05 (C$_6$H$_4$ and C$_6$H$_5$), 132.89 (CH=N, C$_6$H$_5$ and C$_6$H$_4$), 151.17(C$_6$H$_4$); $^{31}$P NMR (162 MHz) δ 8.35 (N$_3$P$_3$ and PPh$_2$), 56.47 (P=S).

$P_3$: To a solution of the dendrimer 2-$_{NNH2}$ (40 mg, 5.94 10$^{-6}$ mol) in 4 mL of THF is added a solution of the dendrimer 3-$_{CHO}$ (40.5 mg, 5.91 10$^{-6}$ mol) in 4 mL of THF. The reaction mixture is left under stirring at ambient temperature for 48 hours. After filtration, the precipitate is washed with THF, ethanol then with acetone. The polydendrimer $P_3$ is obtained in the form of a white powder. $^{13}$C NMR (100 MHz) δ 32.13 (N-Me), 121.42 (C$_6$H$_4$), 128.17 (C$_6$H$_4$, C$_6$H$_5$), 132.49 (CH=N, C$_6$H$_5$ and C$_6$H$_4$), 151.14 (C$_6$H$_4$); $^{31}$P NMR (162 MHz) δ 8.52 (N$_3$P$_3$, PPh$_2$), 57.14 (P=S).

$P_4$: To a solution of the dendrimer 3-$_{NNH2}$ (40 mg, 2.74 10$^{-6}$ mol) in 5 mL of acetone is added a solution of Vio-$_{CHO}$ (45 mg, 6.58 10$^{-5}$ mol) in 6 mL of acetone. The mixture is left under stirring at ambient temperature for 72 hours then filtered and the precipitate is washed with acetone. The polydendrimer $P_4$ is obtained in the form of an orange powder. $^{13}$C NMR (100 MHz,) δ 32.06 (N-Me), 64.43 (N—CH$_2$), 122.38 (C$_6$H$_4$, NC$_5$H$_4$), 129.00 (C$_6$H$_5$, C$_6$H$_4$, NC$_5$H$_4$), 130.11 (C$_6$H$_4$, NC$_5$H$_4$), 132.07 (C$_6$H$_4$, NC$_5$H$_4$), 137.75 (CH=N, C$_6$H$_5$ and (C$_6$H$_4$), 145.48 (NC$_5$H$_4$), 151.39 (C$_6$H$_4$, NC$_5$H$_4$), 153.69 (C$_6$H$_4$, NC$_5$H$_4$); $^{31}$P NMR (162 MHz,) δ-143.96 (hept, J=702.6 Hz, PF$_6$), 10.70 (N$_3$P$_3$, PPh$_2$), 57.23 (P=S).

$P_5$: To a mixture of 1-$_{COOH}$ (20 mg, 5.95 10$^{-6}$ mol), 1-ethyl-3-(3-dimethylaminopropyl) carbodiimide (15 mg, 7.85 10$^{-5}$ mol) and dimethylaminopyridine (9 mg, 7.4 10$^{-5}$ mol) in 10 mL of THF is added a solution of the dendrimer 1-$_{NNH2}$ (4.8 mg, 1.19 10$^{-5}$ mol). The mixture is left under stirring at ambient temperature for 120 hours. After filtration, the residue is washed with THF and CH$_2$Cl$_2$. The polydendrimer $P_5$ is obtained in the form of a white powder. $^{13}$C NMR (100 MHz) δ 35.52 (N—CH$_3$), 39.73 (N-Me), 121.03 (C$_6$H$_4$), 122.04 (C$_6$H$_4$), 132.03 (C$_6$H$_4$), 138.75

(CH=N and ($C_6H_4$), 140.41 ($C_6H_4$), 151.24 ($C_6H_4$), 167.10 ($C_6H_4$); $^{31}$P NMR (162 MHz) δ 9.13 ($N_3P_3$—O), 27.79 ($N_3P_3$—N), 60.73 (P=S).

$P_6$: To a mixture of the dendrimer 2-$_{COOH}$ (60 mg, 7.63 $10^{-6}$ mol), 1-ethyl-3-(3-dimethylaminopropyl) carbodiimide (38 mg, 2.10 $10^{-4}$ mol) and dimethylaminopyridine (22 mg, 1.83 $10^{-5}$ mol) in 20 mL of THF is added a solution of the dendrimer 1-$_{NNH2}$ (12 mg, 2.96 $10^{-5}$ mol). The reaction mixture is left under stirring for 120 hours at ambient temperature. After filtration, the residue is washed with THF and $CH_2Cl_2$. The polydendrimer $P_6$ is obtained in the form of a white powder. $^{13}$C NMR (100 MHz) δ 40.76 (N-Me), 122.39 ($C_6H_4$), 131.99 ($C_6H_4$), 139.99 ($C_6H_4$), 151.19 ($C_6H_4$), 168.22 (CON); Solid state $^{31}$P NMR (162 MHz) δ 9.14 ($N_3P_3$—O), 27.27 ($N_3P_3$—N), 61.78 (P=S).

The invention claimed is:

1. A method comprising manufacturing nanospherical copolydendrimers forming a three-dimensional network by combining together two or more different dendrimers, wherein the two or more different dendrimers used during co-condensation include at least one heteroatom containing dendrimer that comprises terminal amine functions on a surface thereof and wherein the two or more different dendrimers include at least one heteroatom containing dendrimer that contains a photo-active molecule of viologen, spiropyran, or anthraquinone type.

2. The method according to claim 1, wherein the two or more different dendrimers used during co-condensation include a second heteroatom containing dendrimer that comprises reactive functions on a surface thereof, the reactive function being aldehyde, carboxylic acid, methyl ester, anhydride, or acid chloride functions.

3. The method according to claim 1, wherein the two or more different dendrimers include heteroatom containing amine, aldehyde and acid terminated dendrimers and the heteroatom containing amine, aldehyde and acid terminated dendrimers used during polycondensation are of generation 0 to 10.

4. The method according to claim 1, comprising a polymeric co-condensation of different heteroatom containing dendrimers that is carried out in the absence of catalyst, in the presence of a metal catalyst, a thermal, photochemical or radical initiator.

5. The method according to claim 1, wherein a core of at least one heteroatom containing dendrimer is of cyclotriphosphazene, cyclotetraphosphazene, thiophosphine type.

6. The method according to claim 1, wherein the copolydendrimers obtained are used as additives in photochromic, electrochromic and thermochromic glasses, in paints, in photovoltaic cells, in fuel cells and in nanocomposite nanotechnologies.

* * * * *